Jan. 17, 1933.  W. J. FIEGEL  1,894,558
METHOD OF BABBITTING DOUBLE CONNECTING RODS
Filed May 28, 1930   2 Sheets-Sheet 1
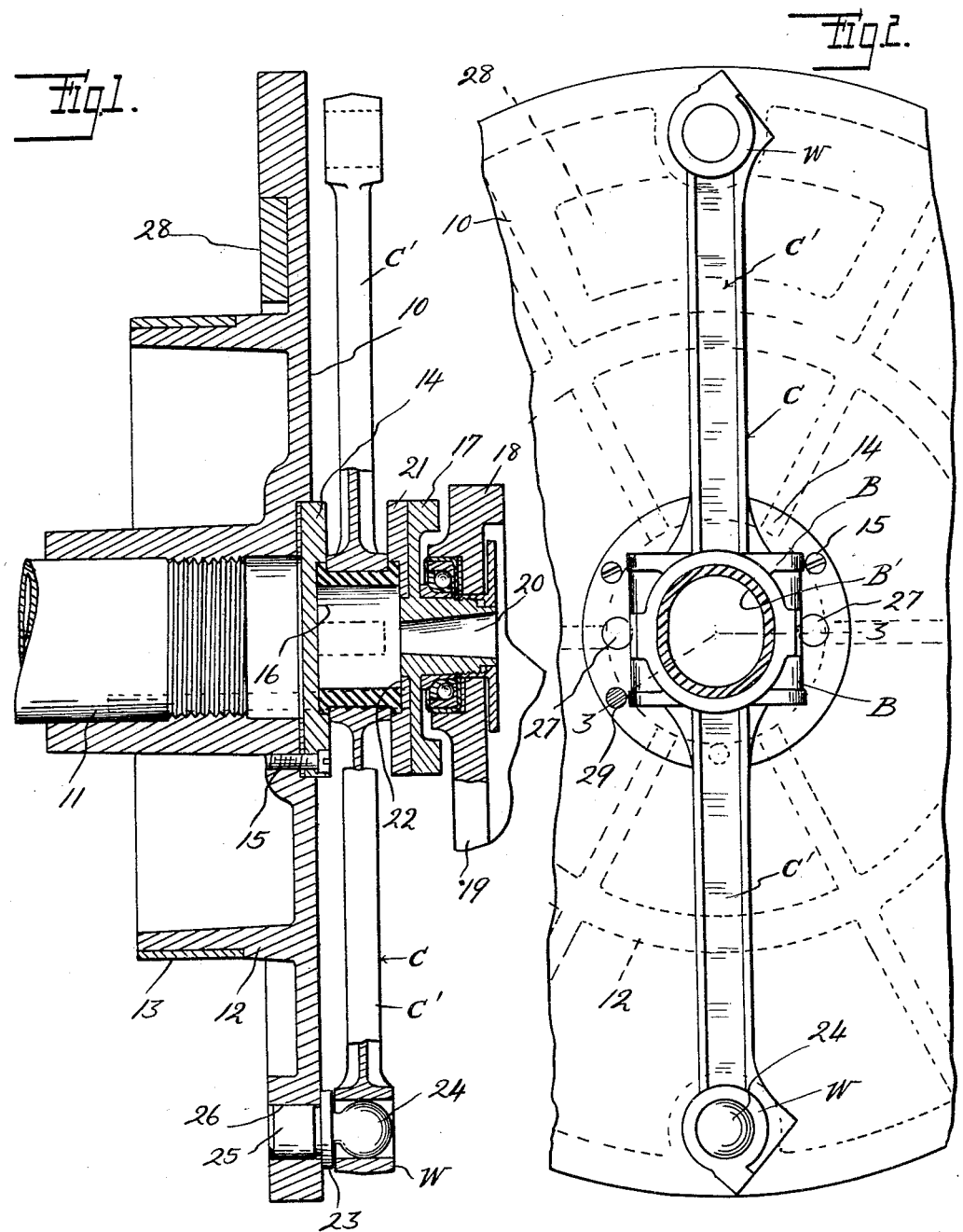
INVENTOR
William J. Fiegel
BY
Whittemore Hulbert Whittemore & Belknap
ATTORNEYS

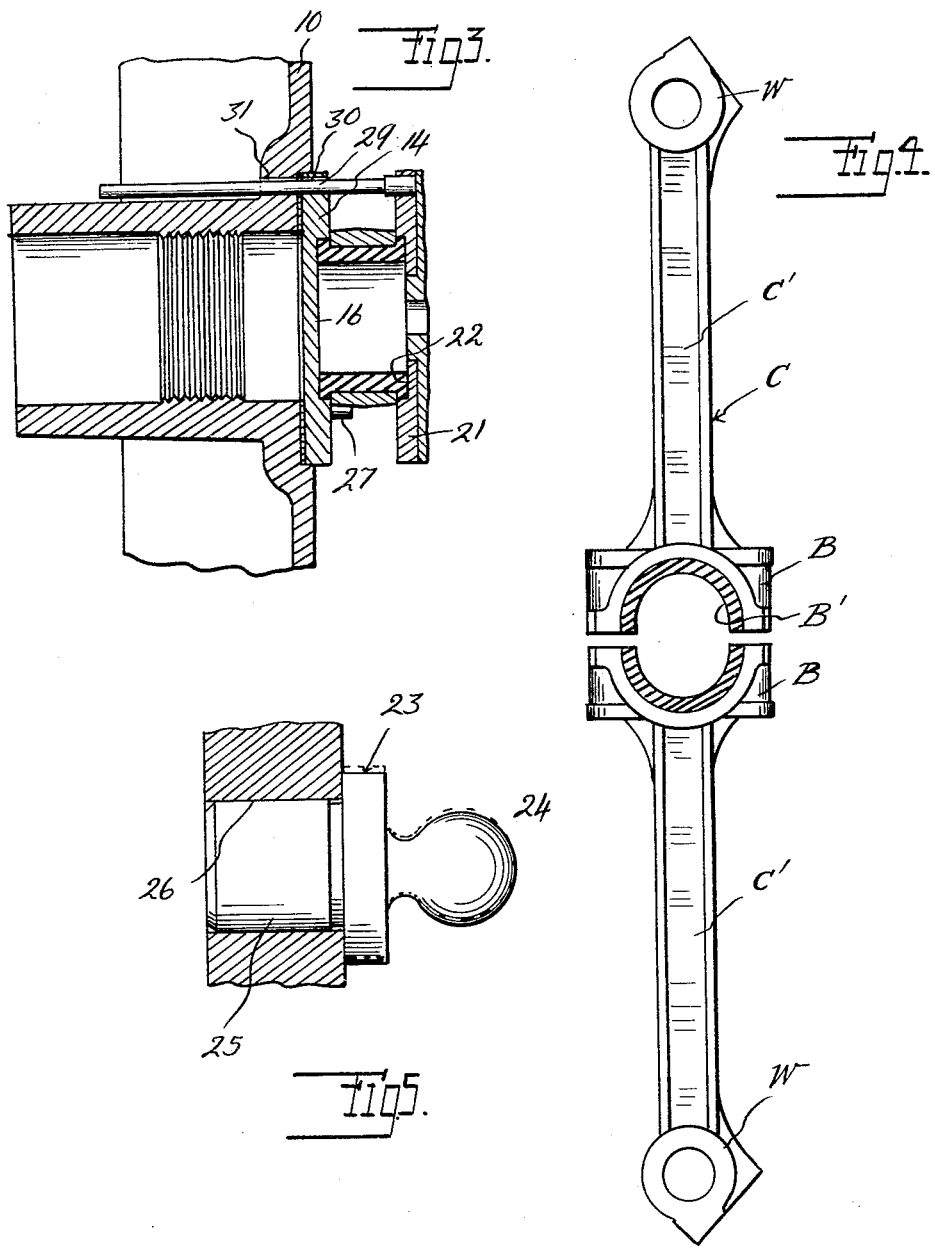

Patented Jan. 17, 1933

1,894,558

UNITED STATES PATENT OFFICE

WILLIAM J. FIEGEL, OF DETROIT, MICHIGAN, ASSIGNOR TO BOHN ALUMINUM & BRASS CORPORATION, OF DETROIT, MICHIGAN, A CORPORATION OF MICHIGAN

METHOD OF BABBITTING DOUBLE CONNECTING RODS

Application filed May 28, 1930. Serial No. 456,710.

This invention relates to a method of babbitting double connecting rods and has as its objects to provide a simple and commercially practical method of this nature.

Heretofore, it has been quite generally the custom in babbitting connecting rods to babbitt a single connecting rod and cap simultaneously. This prior method has several marked disadvantages, one of which is that when babbitting a single connecting rod and cap, the work is unbalanced and the fixture supporting the same has to be balanced to compensate for the unequal distribution of the work thereon. Moreover, in using aluminum connecting rods it is usually customary to employ steel caps and to bolt the steel cap to the connecting rod during the babbitting operation. However, it is difficult to properly flux the surfaces of the two different types of metal because of the nature of the flux employed.

In accordance with the present invention, I propose babbitting a double connecting rod having the main bearing ends thereof integrally connected. Such an arrangement has manifold advantages. For instance, a double connecting rod when connected to the fixture provides for an equal or balanced distribution of the work and thus eliminates the necessity for balancing the fixture. Moreover, the integrally connected main bearing portions which are babbitted do not permit of any leakage of the Babbitt metal, it being understood that after the babbitting, the double rod is sawed in two thus producing two complete rods.

In babbitting an aluminum connecting rod simultaneously with a steel cap, for instance, it is necessary to bolt the two together before babbitting and it is moreover necessary to provide shims between the parts to allow a space for the cutter used for cutting through the babbitt. In practice it is also difficult to remove the connecting bolts and shims after babbitting because the Babbitt metal gets into the threads and renders the removal of the bolts quite difficult. These difficulties are eliminated in accordance with the present invention and the invention provides for a saving in time as there is obviously less handling of parts.

In accordance with the prior art methods, if steel or other caps are bolted to the connecting rod and the two babbitted simultaneously for machining at the same time, it is necessary to drill the bolt holes prior to babbitting. On the other hand, in accordance with the present method the main bearing opening of the two connecting rods is machined before the rods are severed and then the machined half bearing portion of the connecting rod may be conveniently employed as a centering means in the subsequent operation of boring the bolt holes so that a more accurate job is possible.

In accordance with the present invention, the fixture provides means for anchoring the double connecting rod at one end and for holding the rod intermediate its ends between two side pins which permit the expansion of the rod during the babbitting operation due to heat.

The several objects, advantages and novel details of construction of this invention will be made more apparent as this description proceeds, especially when considered in connection with the accompanying drawings wherein, Figure 1 is a vertical sectional elevational view of a fixture employed in babbitting a double connecting rod in accordance with this invention;

Figure 2 is a fragmentary front elevational view of the structure illustrated in Figure 1, certain parts thereof being omitted;

Figure 3 is an enlarged fragmentary sectional view taken substantially on the plane indicated by line 3—3 in Figure 2;

Figure 4 is a view of the double connecting rod after the babbitting operation and after being severed, and Figure 5 is a detail sectional elevational view of a part of the fixture.

Referring now particularly to the drawings wherein like reference characters indicate like parts, it will be noted that there is indicated a fixture plate 10 in the form of a circular plate-like member rotatably mounted by means of a shaft 11 which may be driven in any preferred or desired manner (not shown). The fixture plate 10 is provided with an annular rearwardly extending flange 12 having a steel insert or band 13 with which a braking element (not shown) is adapted to engage to stop rotation of the fixture plate. The front face of the fixture plate is provided with a babbitting collar 14 secured thereto as, for instance, by means of bolts 15, the front face of this babbitting collar being recessed as at 16.

The reference character 17 indicates a face plate rotatably mounted on the bearing end 18 of a standard or support 19. The face plate 17 is provided with a centrally arranged aperture 20 for introducing the molten Babbitt metal and further with a babbitting collar 21 similar to the babbitting collar 14, and also provided with a recessed face 22.

The double connecting rod is indicated by the reference character C, this double connecting rod comprising two rod portions C' connected at their main bearing ends B. The reference character W indicates the wrist pin bearing ends of the rods.

The double connecting rod C is connected to the fixture plate 10 at one end of the former by means of an anchoring pin 23 having a spherical portion 24 adapted for engagement with the wrist pin bearing aperture W at one end of the connecting rod. The shank 25 of the anchoring pin extends into a recess 26 in the fixture plate and the shank 25 and spherical end 24 are eccentric with respect to one another so that by rotating the anchoring pin in its aperture 26, the double connecting rod may be shifted longitudinally to properly position the bearing opening B' with respect to the recesses 16 and 22 of the babbitting collars 41 and 21, respectively.

The double connecting rod is further held in place on the fixture plate by means of pins 27 which project outwardly from the face of babbitting collar 14 to engage opposite sides of the main bearing portions B.

The reference character 28 indicates a balance piece fixed to the rear face of the fixture plate 10 at a point diametrically opposite the anchoring pin 23 so as to counterbalance this anchoring pin.

In order to cause the babbitting collar 21 to rotate in unison with the babbitting collar 14 in the fixture plate, I provide a pin 29 carried by the babbitting collar 21 and adapted to extend through aligned apertures 30 and 31 in the babbitting collar 14 and fixture plate 10, respectively.

With the double connecting rod attached to the fixture plate in the manner illustrated, the fixture plate will be rotated rapidly and molten Babbitt metal is fed into the opening B' formed by the combined main bearing portions B. Centrifugal force will distribute this Babbitt metal around the surface of the opening D' and around the outer opposed faces of the double connecting rod, by reason of the recesses 16 and 22, in the manner and to the extent substantially as illustrated in Figures 1 and 3. Inasmuch as the wall of the opening B' is integral throughout, no leakage of the Babbitt metal will occur and the two main bearing portions of the double connecting rod may accordingly be rapidly and efficiently babbitted. Any expansion of the double connecting rod C is obviously permitted by reason of the manner in which the rod is mounted upon the fixture plate. By rotatively adjusting the anchoring pin 23 the double connecting rod may be moved to correctly position the opening B' with respect to the babbitting collar.

After the babbitting operation, the rod is removed from the fixture plate and the babbitted opening of the two connecting rods is machined. Thereafter, the double rod is severed in two at a point intermediate the two bearing portions B. Thereafter, the machined half bearing portion of the single connecting rod is employed as a centering means in the subsequent operation of boring the bolt holes.

Obviously, various changes in the many nonessential details of construction and in the method of practicing the present invention will become apparent to those skilled in this art, and to this end reservation is made to make such changes as may come within the purview of the accompanying claims.

What I claim as my invention is:

1. In the method of babbitting connecting rods, those steps which consist in forming a double connecting rod with the main bearing ends of the individual rods united, balancing the rod by rotating the same about the center of the recess formed by the main bearing ends, and simultaneously babbitting the two main bearing ends.

2. In the method of babbitting connecting rods, those steps which consist in forming a double connecting rod united at the main bearing ends, rotating the double connecting rod about its geometrical center, and supplying molten Babbitt metal to the main bearing ends whereby the Babbitt metal is distributed by centrifugal force.

3. The method of babbitting connecting rods comprising forming a double connecting rod united at the main bearing ends, rotating said double rod about an axis coincident with the common axis of the main bearing ends, and feeding molten Babbitt metal into the recess formed by the main bearing ends of the rod whereby said Babbitt metal is distributed by centrifugal force.

4. In the method of babbitting connecting rods, those steps which consist in arranging a pair of connecting rods with their main bearing ends together to form a recess, feeding molten Babbitt metal into said recess and rotating said rods about the center of said recess to distribute said Babbitt metal by centrifugal force.

5. In the method of babbitting connecting rods, those steps which consist in arranging a pair of connecting rods with their main bearing ends together to form a recess, rotating the connecting rods about a center coincident with the axis of said recess, and feeding molten Babbitt metal into said recess.

6. In the method of babbitting connecting rods, those steps which consist in forming a double connecting rod with the main bearing ends integrally united to form a recess, feeding molten Babbitt metal into said recess, rotating said connecting rod about a center coincident with the axis of said recess to distribute said molten metal by centrifugal force, machining the babbitted surface, severing the double connecting rod in half at the juncture of the main bearing ends, and boring the bolt holes in the main bearing end while the connecting rod is centered through the machined surface thereof.

7. In the method of babbitting connecting rods, those steps which consist in forming a double connecting rod with the main bearing ends of the individual rods united, rotating the double rod about the center of the recess formed by the main bearing ends thereof, feeding molten metal into the recess aforesaid during rotation of the double rod so as to centrifugally cast the metal to the surfaces of the recess and subsequently severing the double rod at the juncture of the main bearing ends.

8. The method of babbitting connecting rods comprising, forming a double connecting rod united at the main bearing ends, rotating said double rod about an axis coincident with the center of the recess formed by the main bearing ends, and feeding molten Babbitt metal into the recess aforesaid.

In testimony whereof I affix my signature.

WILLIAM J. FIEGEL.